United States Patent
Korovin

(10) Patent No.: US 12,038,550 B2
(45) Date of Patent: Jul. 16, 2024

(54) NUCLEAR MAGNETIC RESONANCE ANTENNA PACKING

(71) Applicant: Halliburton Energy Services, Inc., Houston, TX (US)

(72) Inventor: Alexei Korovin, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 120 days.

(21) Appl. No.: 18/077,412

(22) Filed: Dec. 8, 2022

(65) Prior Publication Data

US 2024/0192399 A1 Jun. 13, 2024

(51) Int. Cl.
| | |
|---|---|
| *G01V 3/32* | (2006.01) |
| *E21B 47/13* | (2012.01) |
| *E21B 49/00* | (2006.01) |
| *G01V 3/30* | (2006.01) |
| *H01Q 1/04* | (2006.01) |

(52) U.S. Cl.
CPC ............... *G01V 3/32* (2013.01); *E21B 47/13* (2020.05); *E21B 49/00* (2013.01); *G01V 3/30* (2013.01); *H01Q 1/04* (2013.01)

(58) Field of Classification Search
CPC .. G01V 3/32; G01V 3/30; E21B 47/13; E21B 49/00; H01Q 1/04
See application file for complete search history.

(56) References Cited

U.S. PATENT DOCUMENTS

| 7,064,549 B1 | 6/2006 | Hudson |
| 10,027,013 B2 | 7/2018 | Korovin et al. |
| 10,167,715 B2 | 1/2019 | Rashid et al. |
| 2015/0331137 A1 | 11/2015 | Knizhnik |
| 2017/0085008 A1 | 3/2017 | Xiao et al. |
| 2017/0260845 A1* | 9/2017 | Rashid .................... E21B 49/00 |
| 2017/0269252 A1 | 9/2017 | Fang et al. |
| 2018/0003852 A1* | 1/2018 | Jachmann ................ G01V 3/32 |
| 2020/0217192 A1 | 7/2020 | Li et al. |
| 2022/0091295 A1* | 3/2022 | Reiderman ........ G01R 33/3415 |

FOREIGN PATENT DOCUMENTS

| WO | 2016209273 A1 | 12/2016 |
| WO | 2017069744 A1 | 4/2017 |

OTHER PUBLICATIONS

International Search Report & Written Opinion; PCT Application No. PCT/US2022/052392; mailed Aug. 28, 2023.

\* cited by examiner

*Primary Examiner* — G. M. A Hyder
(74) *Attorney, Agent, or Firm* — NOVAK DRUCE CARROLL LLP

(57) ABSTRACT

Aspects of the subject technology relate to systems and methods for packing nuclear magnetic resonance ("NMR") antennas for an NMR sensor. Specifically, a magnetic shielding layer of the NMR sensor can be formed in a first concentric layer about a mandrel of a downhole tool. A first antenna of a plurality of antennas of the NMR sensor can be formed in a second concentric layer on top of the first concentric layer through an automated machining process. Further, a second antenna of the plurality of the antennas of the NMR sensor can be formed in a third concentric layer on top of the second concentric layer through the automated machining process.

20 Claims, 10 Drawing Sheets

NUCLEAR MAGNETIC RESONANCE ANTENNA PACKING

TECHNICAL FIELD

The present technology pertains to packing nuclear magnetic resonance ("NMR") antennas for an NMR sensor, and more particularly, to forming a plurality of antennas of the NMR sensor through an automated machining process.

BACKGROUND

In the field of logging (e.g., wireline logging, logging while drilling ("LWD") and measurement while drilling ("MWD")), NMR tools have been used to explore the subsurface based on the magnetic interactions with subsurface material. Some downhole NMR tools include a magnet assembly that produces a static magnetic field, and a coil assembly that generates radio frequency ("RF") control signals and detects magnetic resonance phenomena in the subsurface material. Properties of the subsurface material can be identified from the detected phenomena.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
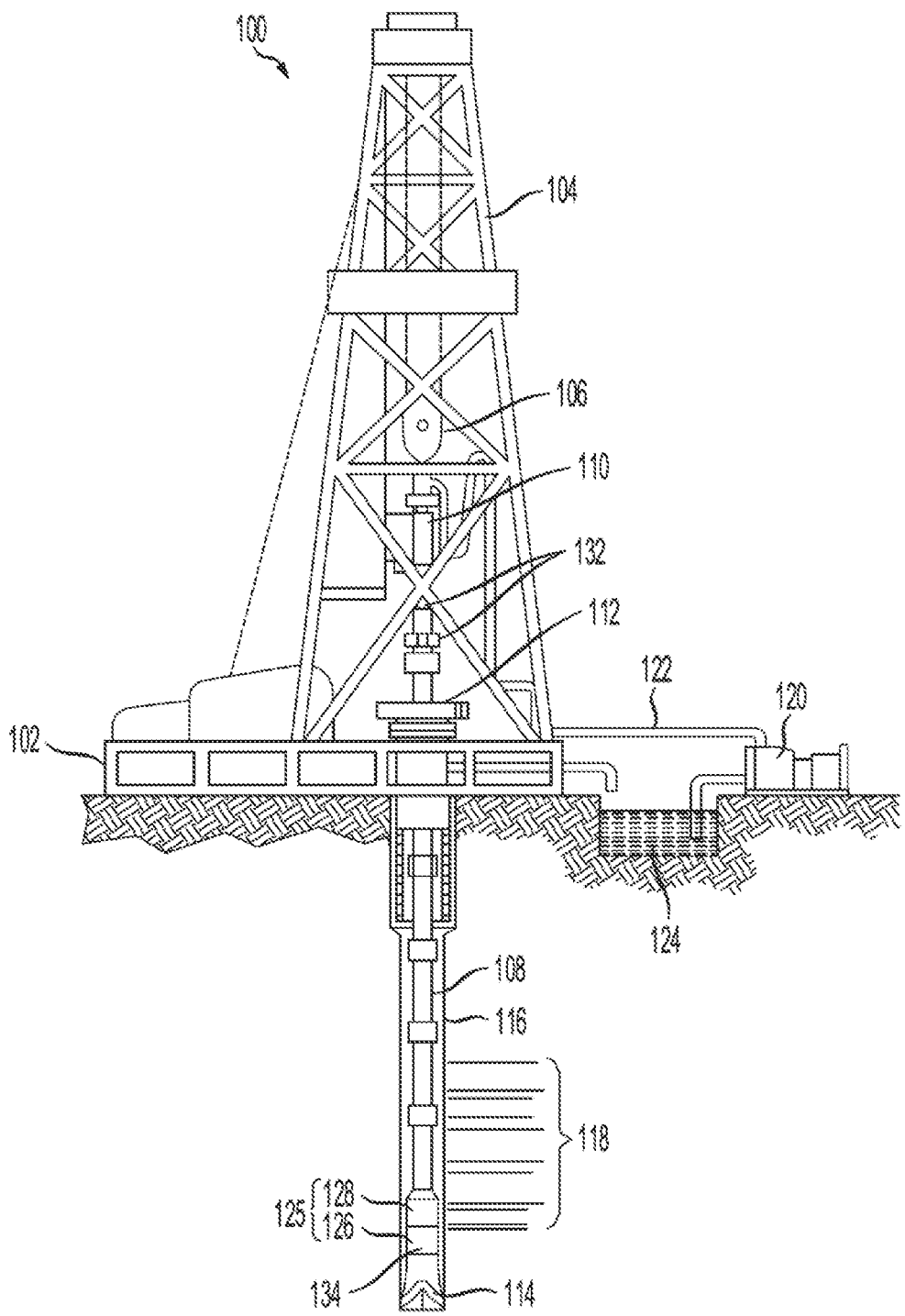
FIG. 1A is a schematic diagram of an example logging while drilling wellbore operating environment, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

As discussed previously, NMR tools have been used to explore the subsurface based on the magnetic interactions with subsurface material. Some downhole NMR tools include a magnet assembly that produces a static magnetic field, and a coil assembly that generates radio frequency ("RF") control signals and detects magnetic resonance phenomena in the subsurface material. Properties of the subsurface material can be identified from the detected phenomena.

Portions of NMR tools, such as NMR sensors, for downhole tools are built by skilled technicians instead of being built through an automated process. For example, NMR antennas can be hand built by skilled technicians. The processes for building components of NMR tools are complex and require numerous steps. For example, the process of building NMR antennas for an NMR sensor can have over 10 steps. As a result of both manufacturing process complexity and technician skill diversity, NMR tool components have large variances across the components. As follows, this can lead to difficulties with strength, compactness, and scalability to multiple sizes in downhole tools Further, the variance can create a need for tedious calibrations of NMR devices used in downhole tools, e.g. with respect to NMR antennas across the devices as calibration stabilizes the variance between antennas.

The disclosed technology addresses the foregoing by manufacturing NMR components of a downhole tool through an automated and repeatable process. Specifically, NMR antennas can be formed in concentric layers about a mandrel of a downhole tool through an automated machining process.

In various embodiments, a method of manufacturing an NMR sensor for a downhole tool can comprise forming a magnetic shielding layer of the NMR sensor in a first concentric layer about a mandrel of the downhole tool. The method can also comprise forming a first antenna of a plurality of antennas of the NMR sensor in a second concentric layer on top of the first concentric layer through an automated machining process. Further, the method can comprise forming a second antenna of the plurality of the antennas of the NMR sensor in a third concentric layer on top of the second concentric layer through the automated machining process.

In various embodiments, an NMR sensor for a downhole tool comprises a magnetic shielding layer formed in a first concentric layer about a mandrel of the downhole tool. The NMR sensor can also comprise a first antenna of a plurality of antennas formed in a second concentric layer on top of the first concentric layer through an automated machining process. Further, the NMR sensor can comprise a second antenna of the plurality of the antennas formed in a third concentric layer on top of the second concentric layer through the automated machining process.

Turning now to FIG. 1A, a drilling arrangement is shown that exemplifies a Logging While Drilling (commonly abbreviated as LWD) configuration in a wellbore drilling scenario 100. Logging-While-Drilling typically incorporates sensors that acquire formation data. Specifically, the drilling arrangement shown in FIG. 1A can be used to gather formation data through an electromagnetic imager tool as part of logging the wellbore using the electromagnetic imager tool. The drilling arrangement of FIG. 1A also exemplifies what is referred to as Measurement While Drilling (commonly abbreviated as MWD) which utilizes sensors to acquire data from which the wellbore's path and position in three-dimensional space can be determined. FIG. 1A shows a drilling platform 102 equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, it creates a wellbore 116 that passes through various subterranean formations 118. A pump 120 circulates drilling fluid through a supply pipe 122 to top drive 110, down through the interior of drill string 108 and out orifices in drill bit 114 into the wellbore. The drilling fluid returns to the surface via the annulus around drill string 108, and into a retention pit 124. The drilling fluid transports cuttings from the wellbore 116 into the retention pit 124 and the drilling fluid's presence in the annulus aids in maintaining the integrity of the wellbore 116. Various materials can be used for drilling fluid, including oil-based fluids and water-based fluids.

Logging tools 126 can be integrated into the bottom-hole assembly 125 near the drill bit 114. As the both drill bit 114 extends into the wellbore 116 through the formations 118 and as the drill string 108 is pulled out of the wellbore 116, logging tools 126 collect measurements relating to various formation properties as well as the orientation of the tool and various other drilling conditions. The logging tool 126 can be applicable tools for collecting measurements in a drilling scenario, such as the electromagnetic imager tools described herein. Each of the logging tools 126 may include one or more tool components spaced apart from each other and communicatively coupled by one or more wires and/or other communication arrangement. The logging tools 126 may also include one or more computing devices communicatively coupled with one or more of the tool components. The one or more computing devices may be configured to control or monitor a performance of the tool, process logging data, and/or carry out one or more aspects of the methods and processes of the present disclosure.

The bottom-hole assembly 125 may also include a telemetry sub 128 to transfer measurement data to a surface receiver 132 and to receive commands from the surface. In at least some cases, the telemetry sub 128 communicates with a surface receiver 132 by wireless signal transmission. e.g, using mud pulse telemetry, EM telemetry, or acoustic telemetry. In other cases, one or more of the logging tools 126 may communicate with a surface receiver 132 by a wire, such as wired drill pipe. In some instances, the telemetry sub 128 does not communicate with the surface, but rather stores logging data for later retrieval at the surface when the logging assembly is recovered. In at least some cases, one or more of the logging tools 126 may receive electrical power from a wire that extends to the surface, including wires extending through a wired drill pipe. In other cases, power is provided from one or more batteries or via power generated downhole.

Collar 134 is a frequent component of a drill string 108 and generally resembles a very thick-walled cylindrical pipe, typically with threaded ends and a hollow core for the conveyance of drilling fluid. Multiple collars 134 can be included in the drill string 108 and are constructed and intended to be heavy to apply weight on the drill bit 114 to assist the drilling process. Because of the thickness of the collar's wall, pocket-type cutouts or other type recesses can be provided into the collar's wall without negatively impacting the integrity (strength, rigidity and the like) of the collar as a component of the drill string 108.

Figure 1B:
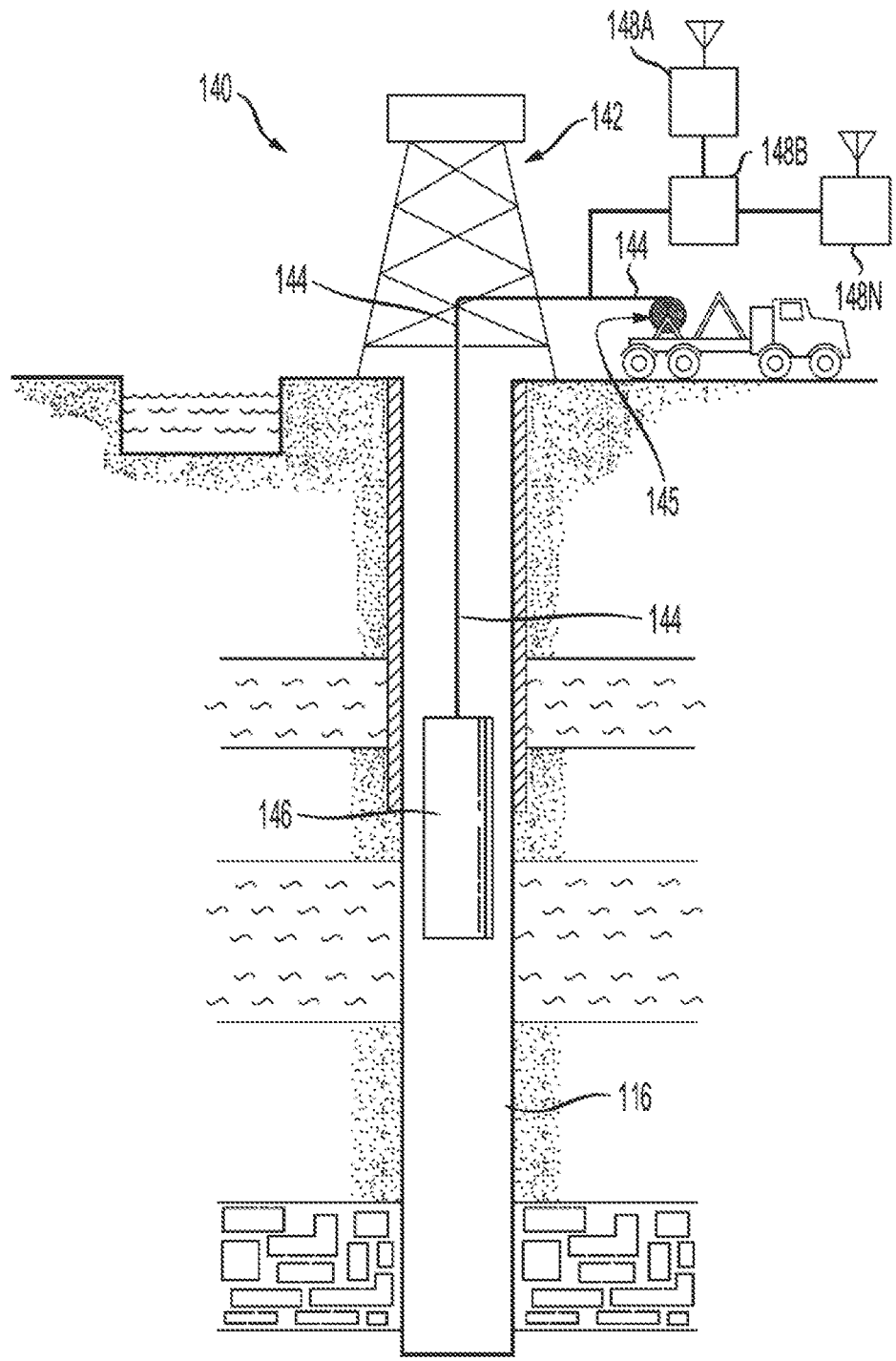
FIG. 1B is a schematic diagram of an example downhole environment having tubulars, in accordance with various aspects of the subject technology.

Referring to FIG. 1B, an example system 140 is depicted for conducting downhole measurements after at least a portion of a wellbore has been drilled and the drill string removed from the well. A downhole tool can be operated in the example system 140 shown in FIG. 1B to log the wellbore. A downhole tool is shown having a tool body 146 in order to carry out logging and/or other operations. For example, instead of using the drill string 108 of FIG. 1A to lower the downhole tool, which can contain sensors and/or other instrumentation for detecting and logging nearby characteristics and conditions of the wellbore 116 and surrounding formations, a wireline conveyance 144 can be used. The tool body 146 can be lowered into the wellbore 116 by wireline conveyance 144. The wireline conveyance 144 can be anchored in the drill rig 142 or by a portable means such as a truck 145. The wireline conveyance 144 can include one or more wires, slicklines, cables, and/or the like, as well as tubular conveyances such as coiled tubing, joint tubing, or other tubulars. The downhole tool can include an applicable tool for collecting measurements in a drilling scenario, such as the electromagnetic imager tools described herein.

The illustrated wireline conveyance 144 provides power and support for the tool, as well as enabling communication between data processors 148A-N on the surface. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more of the processors 148A-N, which can include local and/or remote processors. The processors 148A-N can be integrated as part of an applicable computing system, such as the computing device architectures described herein. Moreover, power can be supplied via the wireline conveyance 144 to meet power requirements of the tool. For slickline or coiled tubing configurations, power can be supplied downhole with a battery or via a downhole generator.

Figure 2:
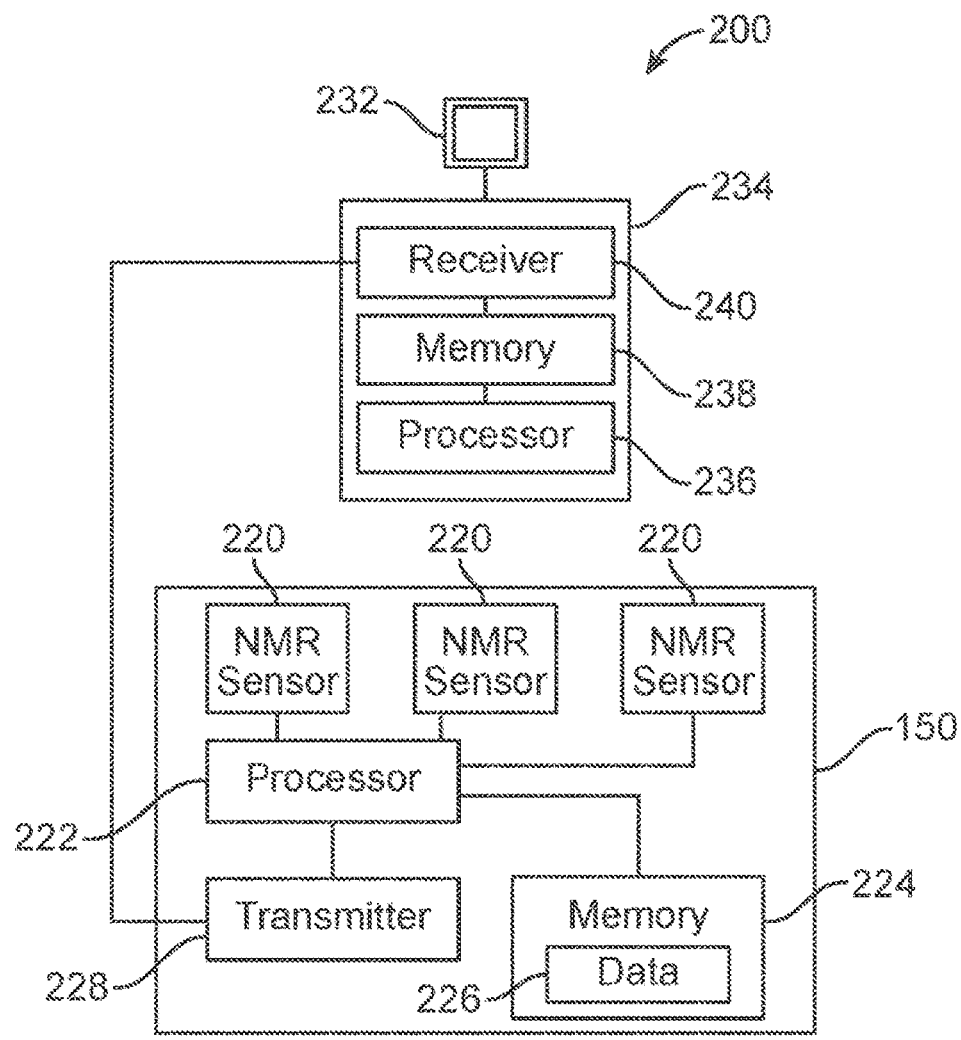
FIG. 2 illustrates an NMR apparatus, in accordance with various aspects of the subject technology.

FIG. 2 illustrates an example NMR apparatus 200. The example NMR apparatus shown in FIG. 2 can be implemented in an applicable environment, such as the LWD environment shown in FIG. 1A and the wireline environment shown in FIG. 1B. As shown in FIG. 2, the NMR apparatus 200 may include an NMR data acquisition tool 150 communicatively coupled to an NMR data processing unit 234. The NMR data acquisition tool 150 may include one or more NMR sensors 220 communicatively coupled to an NMR data acquisition processor 222. The NMR data acquisition tool 150 may further include data acquisition memory 224 capable of storing instructions that when executed by the data acquisition processor 222 causes the data acquisition processor 222 to acquire NMR data in a time domain from a subterranean formation, or core sample therefrom, using one or more NMR sensors 220. The data acquisition memory 224 is also capable of storing acquired NMR data 226.

The NMR data acquisition processor 222 may optionally be communicatively coupled to a transmitter 228 capable of transmitting the acquired NMR data 226 to the NMR data processing unit 234.

The NMR data processing unit 234 can include a data processor 236 communicatively coupled to data processing memory 238 capable of storing instructions that when executed by the data processor 236 causes the data processor 236 to receive the NMR data 226 from the NMR data acquisition tool 150. The NMR data processing unit 234 may optionally have a receiver 240 capable of receiving NMR data 226 from the transmitter 228 of the NMR data acquisition tool 150. The NMR data processing unit 234 may also optionally have a display 232 capable of displaying results generated based on the NMR data 226.

Figure 3:
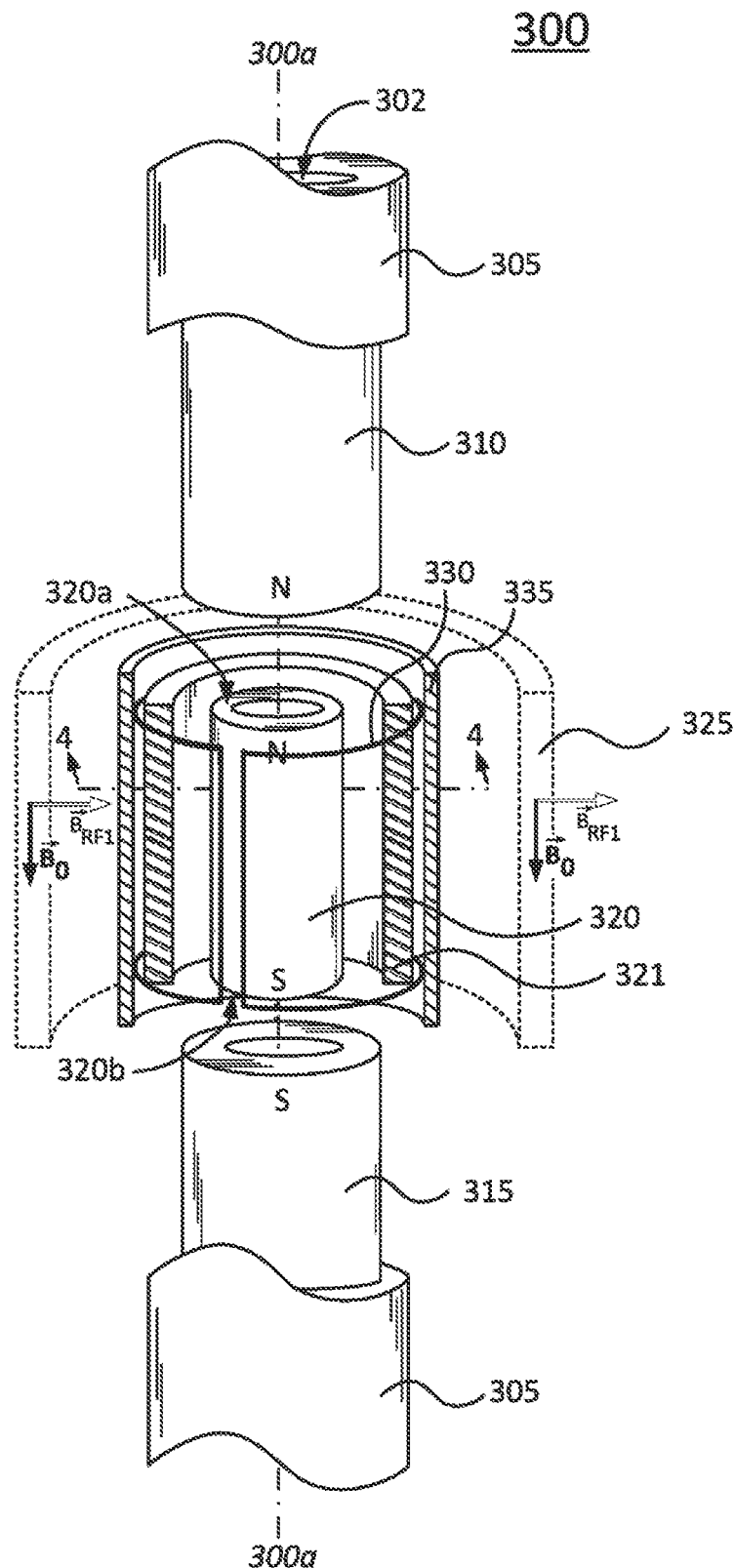
FIG. 3 is a perspective isometric view of an example NMR sensor disposed in an interior volume of a drill collar, in accordance with various aspects of the subject technology.

FIG. 3 is a perspective isometric view of an example NMR sensor 300 disposed in an interior volume of a drill collar 305. The example NMR sensor 300 shown in FIG. 3 can be implemented in an applicable environment, such as the LWD environment shown in FIG. 1A and the wireline environment shown in FIG. 1B.

As illustrated in FIG. 3, NMR sensor 300 is disposed in a drill collar 305. For purposes of clarity, a cutaway view of drill collar 305 is shown. Drill collar 305, as discussed above, provides rigidity to convey a rotational force during drilling operations. In addition, drill collar 305 may be subjected to various impact forces as it rotates about axis 300a (e.g., drilling axis) as it conveys torque required to rotate drill bits/drill assemblies. Drill collar 305 generally has a cylindrical-shape and includes an interior conduit or channel 302 to direct drilling fluid or mud for lubricating drill bits/assemblies and carrying cuttings away from the drill bits/assemblies to the surface.

NMR sensor 300 is a cylindrical structure comprising a first magnet 310, a second magnetic 315, and a central magnet 320 disposed between first magnet 310 and second magnet 315. First magnet 310 and second magnet 315 cooperatively produce a static magnetic field Bo having a desired strength, and central magnet 320 operates to shape the static magnetic field produced by first magnet 310 and second magnet 315. Notably, central magnet 320, first magnet 310 and/or second magnet 315 may each comprise one or more permanent magnetic pieces.

As illustrated, central magnet 320 is an elongated magnetic piece having a first axial end 320a and a second axial end 320b, opposite first axial end 320a. First magnet 310 and second magnet 315 are each axially offset a short distance from first axial end 320a, and second axial end 320b. In addition, central magnet 320 is coupled to a soft magnetic core 321, which may form part of an antenna assembly (discussed below) extending about at least a portion of central magnet 320. Soft magnetic core 321 is typically selected from materials having a high saturation flux density to reduce its cross sectional area/volume when producing a desired magnetic field.

Still referring to FIG. 3, first and second magnets 310, 315 together with central magnet 320 define four magnetic poles, which may be arranged to shape or/and enhance the static magnetic field. In particular, during NMR operations, first magnet 310, second magnet 315, and central magnet 320 induce and shape a static magnetic field Bo in a volume of investigation 325 (e.g., a desired volume of an adjacent earth formation in a wellbore environment). Notably, the static magnetic field Bo is induced in a direction parallel to axis 300a, as indicated.

Volume of investigation 325 substantially and/or completely surrounds NMR sensor 300, however for purposes of clarity, a cutaway view of the volume of investigation 325 is shown. Volume of investigation 325 can be formed axially as well as radially to provide immunity or otherwise decrease its sensitivity to axial motion, lateral motion. Further, volume of investigation 325 is not restricted to any particular shape or size, and the shape and size thereto can be varied as required by an application or design.

NMR sensor 300 also includes an antenna assembly comprising an antenna 330 and soft magnetic core 321. An antenna cover 335 protects the antenna assembly and may form an outward facing or exterior surface of drill collar 305. In this fashion, antenna cover may be subjected to the various forces of a wellbore environment as discussed herein. The antenna assembly extends at least partially about the circumference of a portion of central magnet 320. Here, antenna 330 is a transversal-dipole antenna and is coupled to soft magnetic core 321, which extends about an outer diameter of central magnet 320.

The antenna assembly operatively generates a radio frequency (RF) magnetic field $B_{Rn}$ in a direction orthogonal to static magnetic field Bo. For example, antenna 330 can produce RF sequences (e.g., a series of pulses, delays, etc.) to excite nuclei in volume of investigation 325 and detect responsive signals (e.g., spin-echo signals or other NMR signals). These responsive signals are further processed to determine various physical properties of the adjacent formations. For sake of clarity, a cutaway view of antenna cover 335 and soft magnetic core 321 are shown so that internal components of NMR sensor 300 can be viewed. Further, although antenna 330 is illustrated as a single antenna, other embodiments discussed herein provide for two or more antenna (e.g., mutually orthogonal transversal-dipole antennas, etc.). In addition, although many of the components shown in FIG. 3 are depicted as generally cylindrical structures, the shape of these components are not limited to any particular shape, as is appreciated by those skilled in the art.

Figure 4:
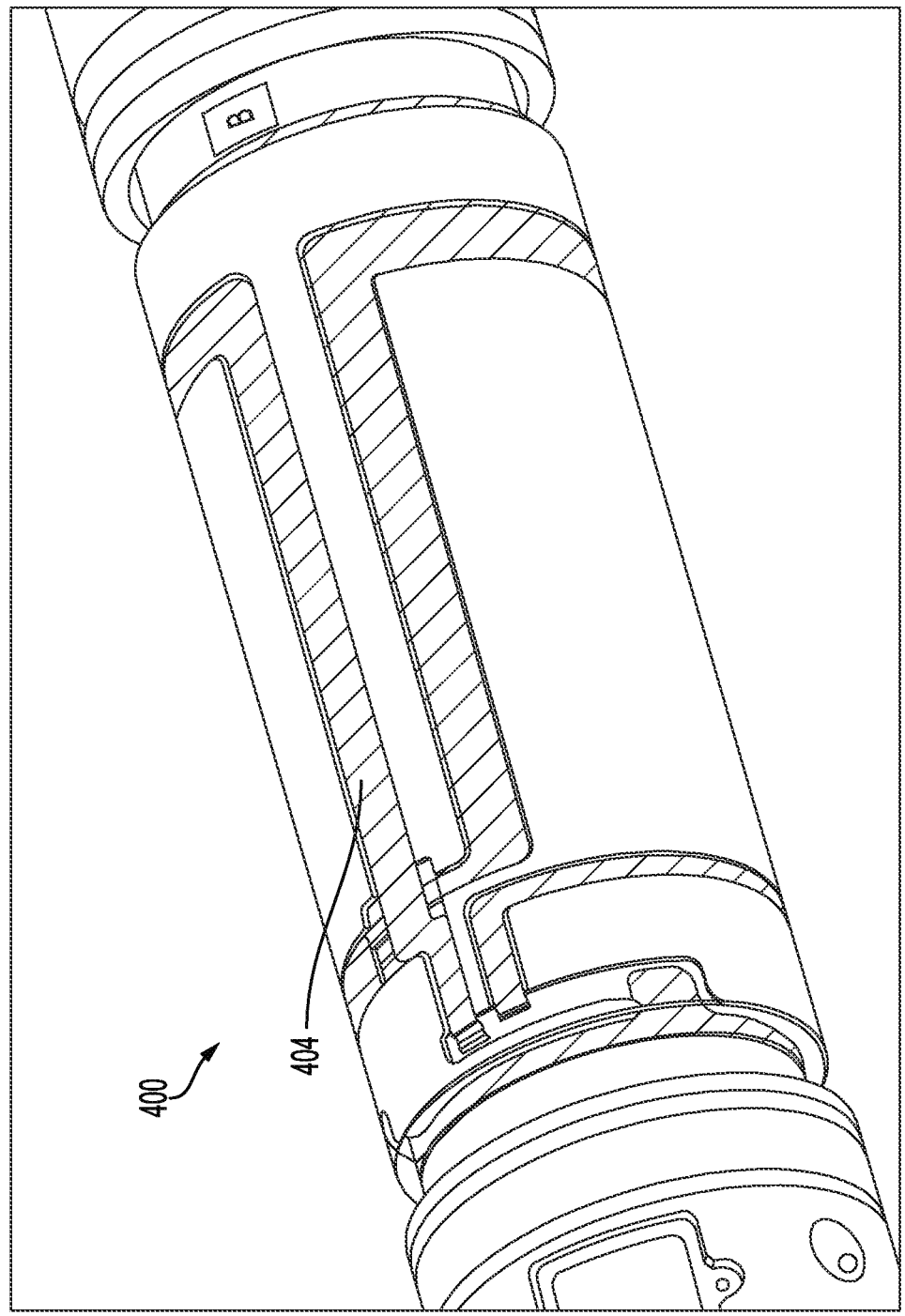
FIG. 4 illustrates a side perspective view of an NMR sensor integrated in a downhole tool, in accordance with various aspects of the subject technology.

FIG. 4 illustrates a side perspective view of an NMR sensor 400 integrated in a downhole tool 402. The NMR sensor 400 includes a first antenna 404. The first antenna 404 functions to transmit signals into a surrounding volume, e.g. formation. Further, the first antenna 404 can receive NMR response signals, e.g. to the signals that are transmitted into the surrounding volume. The first antenna 404 can form part of a plurality of antennas of the NMR sensor 400. The plurality of antennas can operate with each other to transmit signals into a surrounding volume for generating an NMR response in the surrounding volume. As follows, the plurality of antennas can operate with each other to receive NMR responses from the surrounding volume.

Figure 5:
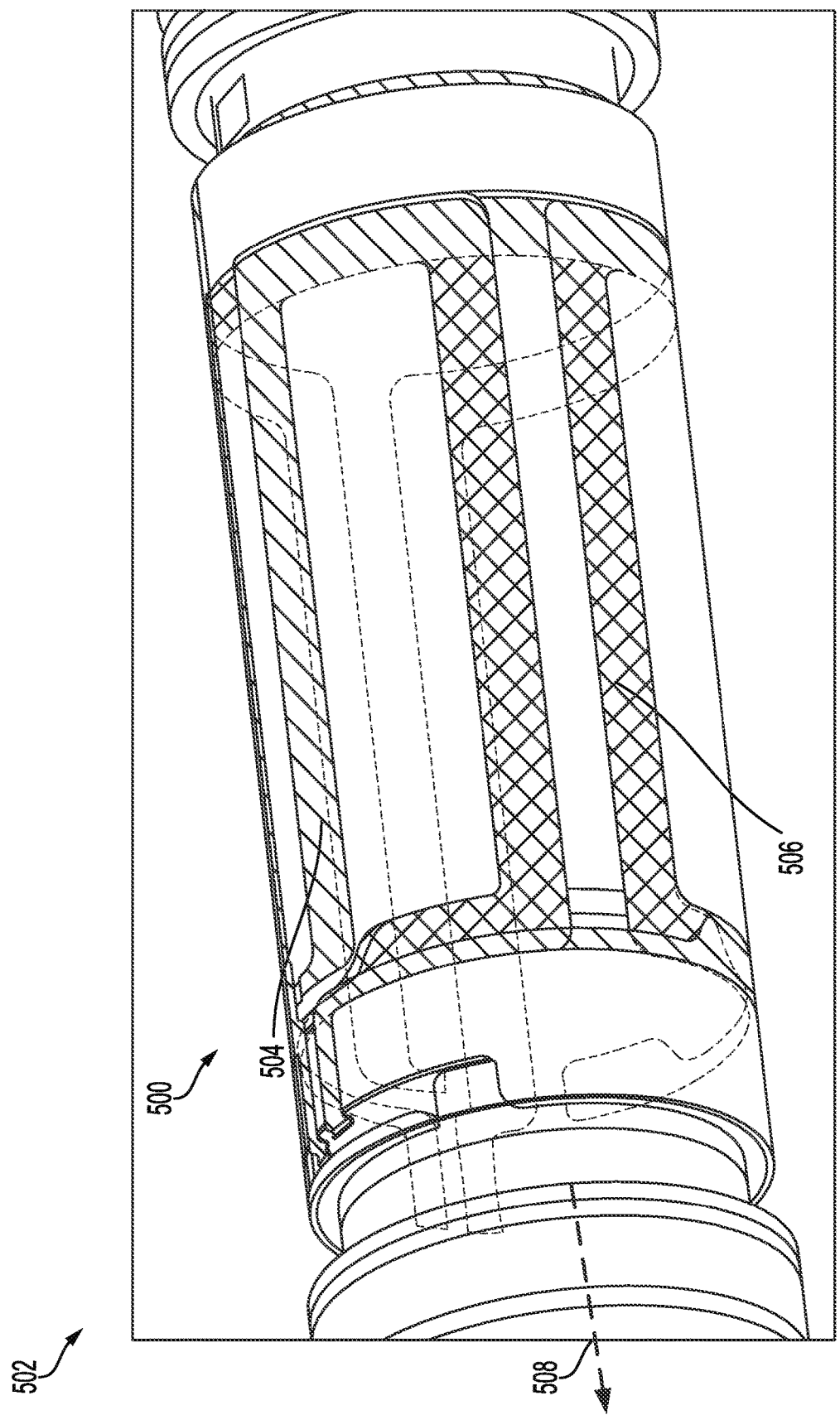
FIG. 5 illustrates a side perspective view of an NMR sensor integrated in a downhole tool with a plurality of antennas, in accordance with various aspects of the subject technology.

FIG. 5 illustrates a side perspective view of an NMR sensor 500 integrated in a downhole tool 502 with a plurality of antennas. Specifically, the NMR sensor 500 includes a first antenna 504. The NMR sensor also includes a second antenna 506. The second antenna 506 is represented by just the outline of the second antenna 506 without any layers in which the second antenna 506 is actually formed. This is done for illustrative purposes as the first antenna 504 and the second antenna 506 are formed in concentric layers. Specifically, the first antenna 504 and the second antenna 506 are formed on different layers having different diameters with respect to a tool axis 508 of the downhole tool 502. More specifically, in the NMR sensor 500 the second antenna 506 can be formed on a concentric layer on top of a concentric layer in which the first antenna 504 is formed. As a result, the second antenna 506 can be formed on a greater diameter with respect to the tool axis 508 when compared to the first antenna 504. Further and in order to demonstrate both antennas within the perspective view of the NMR sensor 500, the second antenna 506 is shown as just the outline of the second antenna with a transparent body.

The first antenna 504 and the second antenna 506 can be clocked, or otherwise polarized, relative to each other. For example, the first antenna 504 and the second antenna 506 can be polarized 90 degrees with respect to each other about the tool axis 508. The 90 degree polarization is merely an example, and the antennas can be polarized with respect to each other by an applicable amount, e.g. 180 degrees, 65 degrees, or 45 degrees. The degrees to which the first antenna 504 and the second antenna 506 are polarized with respect to each other can depend on the number of antennas included in the NMR sensor 500.

The degree by which the first antenna 504 and the second antenna 506 are polarized with respect to each other can depend on the physical position the first antenna 504 and the second antenna 506 within the NMR sensor 500. The physical position of the first antenna 504 and the second antenna 506 within the NMR sensor 500 can depend on how the NMR sensor 500 is manufactured. In particular, and as discussed previously with respect to technicians manufacturing NMR sensors by hand, a wide variance in the positions of the antennas within NMR sensors can be realized across the NMR sensors. This can lead to many of the previously described deficiencies with respect to manufacturing and operating NMR sensors. Specifically and with respect to polarization, this can lead to variances in degrees of polarization between antennas across different NMR sensors. In turn, this can lead to problems in calibrating and operating the different NMR sensors in downhole environments.

The first antenna 504, the second antenna 506, and other applicable NMR antennas described herein can be fabricated from an applicable material for transmitting and receiving wireless electromagnetic signals. Specifically, the first antenna 504 and the second antenna 506 can be fabricated from an electrically conductive material, e.g. copper.

Figure 6:
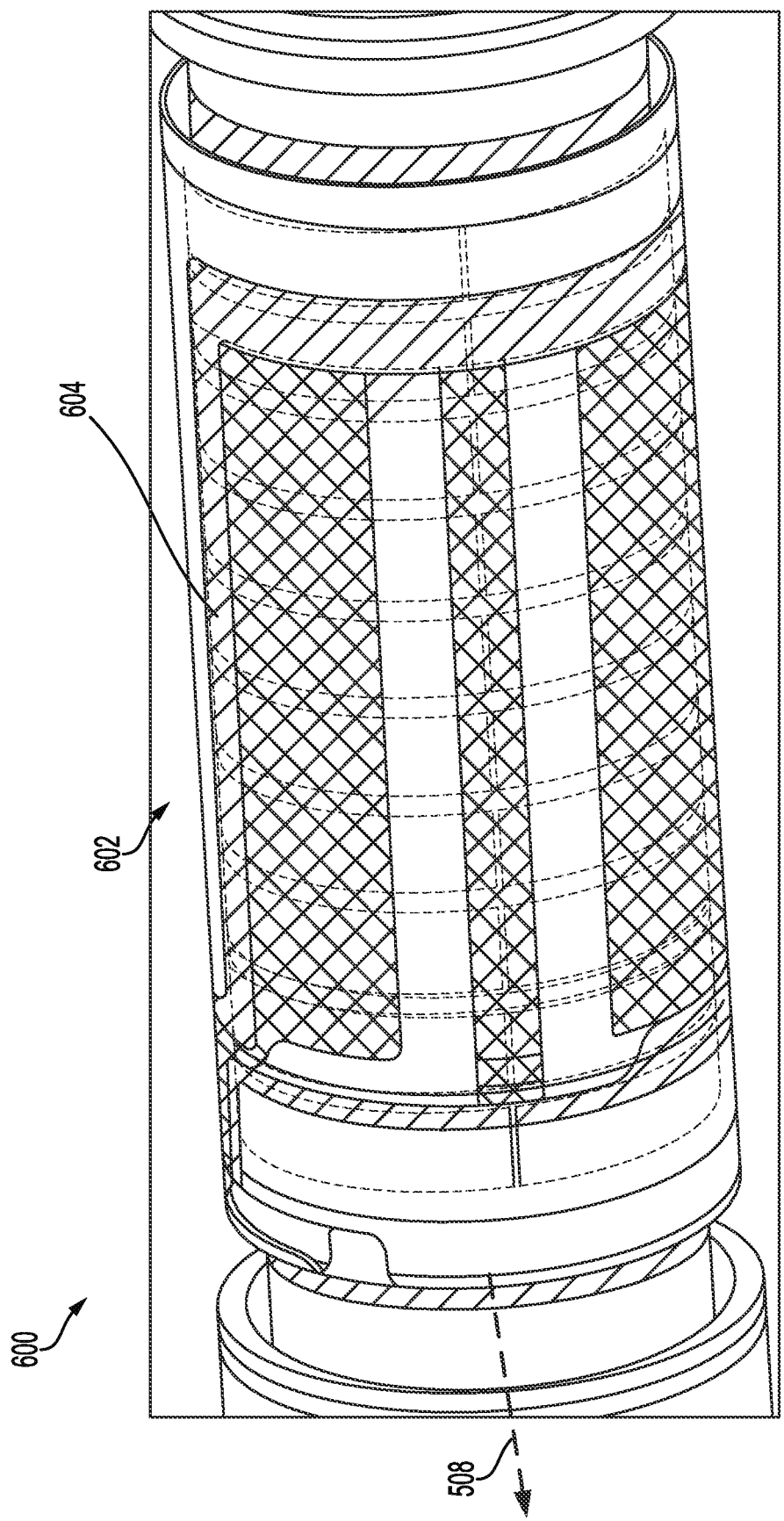
FIG. 6 illustrates a side perspective view of an NMR sensor with a magnetic shielding layer, in accordance with various aspects of the subject technology.

FIG. 6 illustrates a side perspective view of an NMR sensor 600 with a magnetic shielding layer 602. The magnetic shielding layer 602 is illustrated through a transparent outline of individual magnetic shields 604 in an array of magnetic shields. The magnetic shielding layer 602 is formed in a concentric layer, just as the first antenna 504 and the second antenna 506 are formed. Specifically, the magnetic shielding layer can be formed in a concentric layer having a smaller diameter with respect to the tool axis 508 in comparison to the concentric layers in which the first antenna 504 and the second antenna 506 are formed. As a result, the magnetic shielding layer 602 can be positioned between the first antenna 504, the second antenna 506, and one or more central magnets, e.g. central magnet 320, within the core of the NMR sensor 600, otherwise within a mandrel of a downhole tool.

The magnetic shielding layer 602 functions to shield antennas of the NMR sensor 600 from eddy currents that exist on the metal body of the downhole tool. Specifically, the magnetic shielding layer 602 functions to shield the antennas from eddy current that are formed on a mandrel of the downhole tool. The magnetic shielding layer can be comprised of an applicable material for shielding the antennas from eddy currents.

Figure 7:
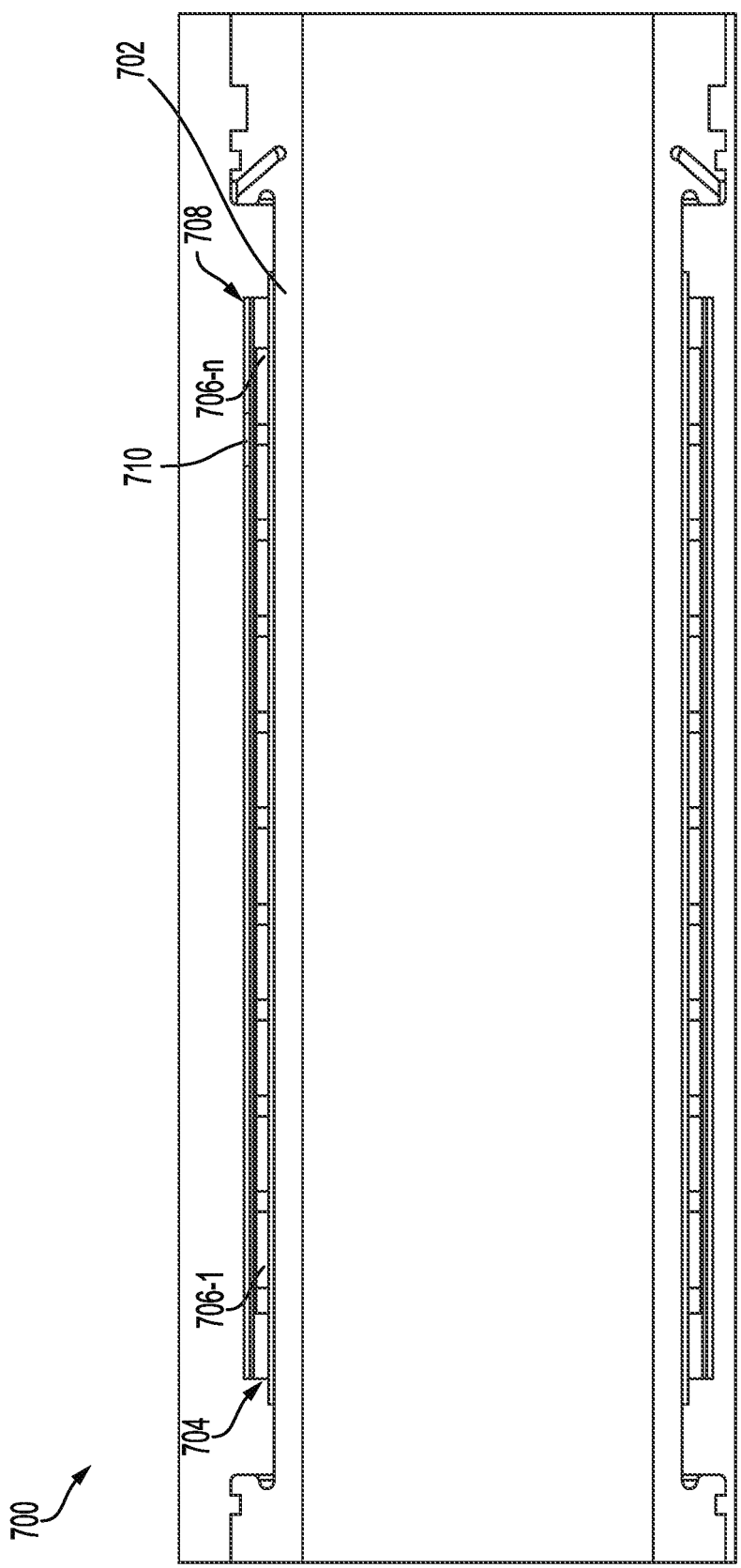
FIG. 7 illustrates a cross sectional view of an NMR sensor, in accordance with various aspects of the subject technology.

FIG. 7 illustrates a cross sectional view of an NMR sensor 700. The NMR sensor 700 includes, or is otherwise formed on, a mandrel 702 of a downhole tool. The mandrel 702 can contain applicable components for generating NMR measurements of a surrounding volume. For example, the mandrel 702 can contain core magnets and other electronic components for generating and processing NMR measurements.

The NMR sensor 700 includes a magnetic shielding layer 704 that is formed as a first concentric layer about the tool mandrel 702. The magnetic shielding layer 704 is formed by magnetic shield 706-1 to magnetic shield 706-$n$ (herein "array of magnetic shields 706"). The array of magnetic shields 706 can be formed in pockets in a polymer layer. The polymer layer can be formed by an applicable polymer material, such as a fiber-reinforced polymer, e.g. fiberglass. As will be discussed in greater detail later, the pockets can be formed through an applicable automated machining process, such as a computerized numerical control (herein "CNC") machining process. After the pockets are formed, a magnetic shielding material can be disposed in the pockets to form each shield in the array of magnetic shields 706.

As part of forming the magnetic shielding layer 704 through an automated machining process, the layer of fiber-reinforced polymer can be formed on the tool mandrel 702. The pockets can then be machined into the fiber-reinforced polymer layer. As follows, the magnetic shielding material can be disposed into the pockets to form the array of magnetic shields 706.

The NMR sensor 700 also includes a first antenna layer 708 that is formed as a second concentric layer. Specifically, the first antenna layer 708 is formed as a second concentric layer on top of the magnetic shielding layer 704 that is formed as the first concentric layer about the tool mandrel 702. The antenna layer 708 includes an antenna that is formed in one or more pockets in a polymer layer. The polymer layer can be formed by an applicable polymer material, such as a fiber-reinforced polymer. Specifically, the one or more pockets can be formed in the polymer layer through an automated machining process. After the pockets are formed, an antenna material can be disposed in the pockets to form the antenna in the first antenna layer 708.

The first antenna layer 708 can be formed on top of the magnetic shielding layer 704 after the magnetic shielding layer 704 is formed. Specifically and as part of forming the first antenna layer 708 through an automated machining process, the layer of fiber-reinforced polymer can be formed on top of the magnetic shielding layer 704. The one or more pockets can then be machined into the fiber-reinforced polymer layer. As follows, the antenna material can be disposed into the pockets to form the antenna in the first antenna layer 708.

While only a single antenna layer is shown in the NMR sensor 700 in FIG. 7, an applicable number of antenna layers can be formed to create the NMR sensor 700. Specifically, a second antenna layer can be formed on top of the first antenna layer 708. As follows a third antenna layer can be formed on top of the second antenna layer. each of these antenna layers can be formed through the automated machining process described herein in a stacked fashion on top of each other.

Figure 8:
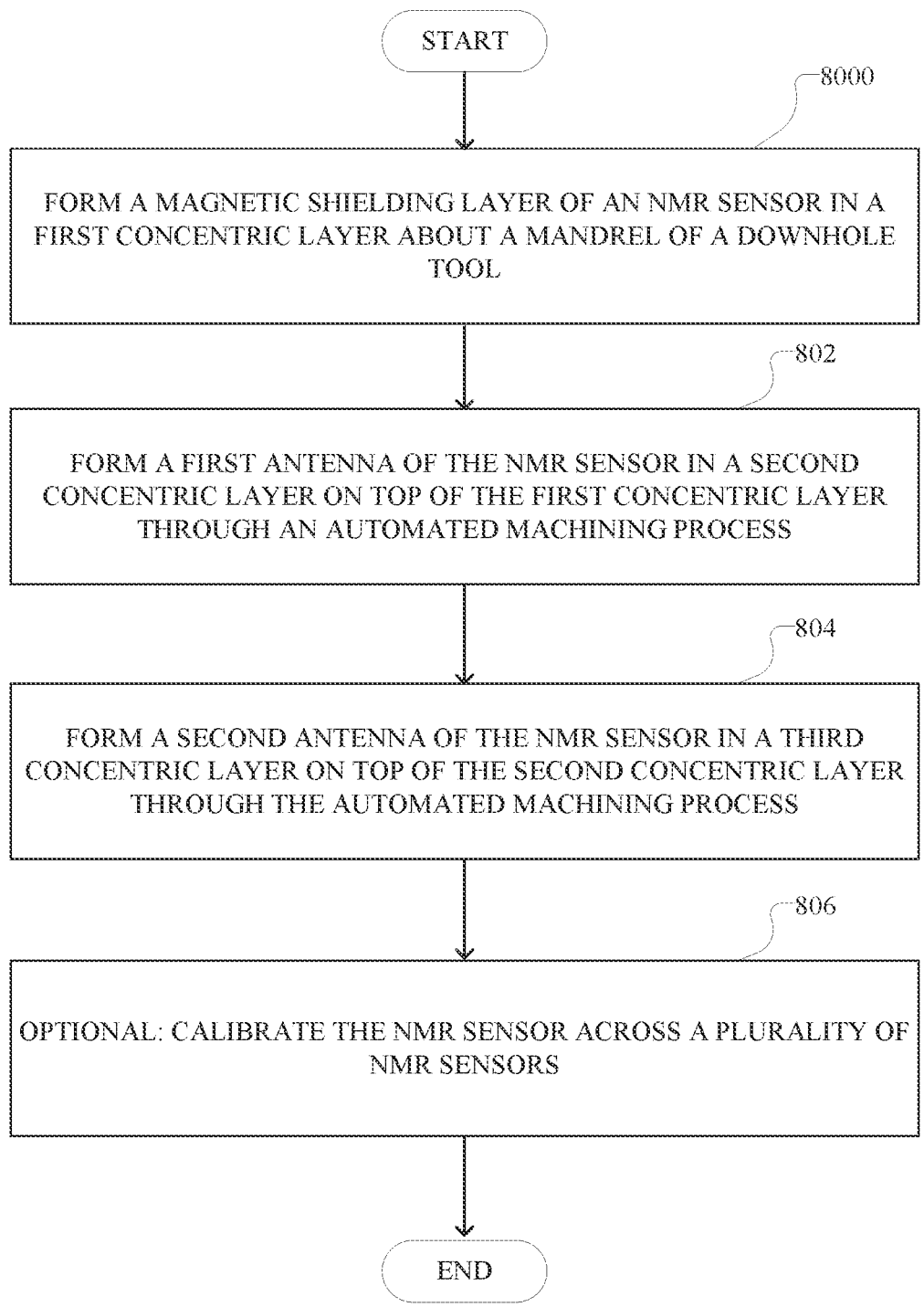
FIG. 8 illustrates a flowchart for an example method of fabricating an NMR sensor, in accordance with various aspects of the subject technology.

FIG. 8 illustrates a flowchart for an example method of fabricating an NMR sensor. The method shown in FIG. 8 is provided by way of example, as there are a variety of ways to carry out the method. Additionally, while the example method is illustrated with a particular order of steps, those of ordinary skill in the art will appreciate that FIG. 8 and the modules shown therein can be executed in any order and can include fewer or more modules than illustrated. Each module shown in FIG. 8 represents one or more steps, processes, methods or routines in the method.

At step 800, a magnetic shielding layer of an NMR sensor is formed in a first concentric layer about a mandrel of a downhole tool. The magnetic shielding layer can function according to an applicable magnetic shielding layer, such as the magnetic shielding layer described herein. Specifically, the magnetic shielding layer can shield antennas of the NMR sensor.

The magnetic shielding layer can be formed at step 800 through an applicable automated machining process, such as the processes described herein. Specifically, a fiber reinforced polymer layer can be formed on top of a mandrel of a downhole tool. Then, one or more pockets can be machined in the fiber reinforced polymer layer through an automated machining process. As follows, a magnetic shielding material can be deposited into the one or more pockets to form the magnetic shielding layer as part of a first concentric layer about the mandrel of the downhole tool.

At step 802, a first antenna of a plurality of antennas of the NMR sensor is formed in a second concentric layer on top of the first concentric layer. The first antenna can function according to an applicable antenna of an NMR sensor, such as the antennas described herein. Specifically, the first antenna can transmit and receive signals associated with making NMR measurements in a volume surrounding the NMR sensor.

The first antenna can be formed at step 802 through an applicable automated machining process, such as the processes described herein. Specifically, a fiber reinforced polymer layer can be formed on top of the first concentric layer that includes the magnetic shielding layer. Then, one or more pockets can be machined in the fiber reinforced polymer layer through an automated machining process. As follows, an antenna material can be deposited into the one or more pockets to form the first antenna as part of a second concentric layer about the first concentric layer.

At step 804, a second antenna of the plurality of antennas of the NMR sensor is formed in a third concentric layer on top of the second concentric layer. The second antenna can function according to an applicable antenna of an NMR sensor, such as the antennas described herein. Specifically, the second antenna can transmit and receive signals associated with making NMR measurements in a volume surrounding the NMR sensor.

The second antenna can be formed at step 804 through an applicable automated machining process, such as the processes described herein. Specifically, a fiber reinforced polymer layer can be formed on top of the second concentric layer that includes the first antenna. Then, one or more pockets can be machined in the fiber reinforced polymer layer through an automated machining process. As follows, an antenna material can be deposited into the one or more pockets to form the second antenna as part of a third concentric layer about the second concentric layer.

The fixed reinforced polymer material can be selected for forming one or a combination of the first concentric layer with the magnetic shielding layer, the second concentric layer with the first antenna, and the third concentric layer with the second antenna based on one or more applicable characteristics of the fixed reinforced polymer layer. Specifically, the fixed reinforced polymer material can be used based on electrical conductivity characteristics of the material. For example, the fixed reinforced polymer material can be used based on the material having a high resistivity, or otherwise being a non-electrically conductive material. Further, the fixed reinforced polymer material can be used based on signal attenuation characteristics of the material. For example, the fixed reinforced polymer material can be used based on the material not attenuating wireless signals that are passed through the material. Additionally, the fixed reinforced polymer material can be used based on mechanical characteristics of the material. For example, the fixed reinforced polymer material can be used based on the material having a high yield strength, e.g. to support operation in a downhole environment.

The fixed reinforced polymer material can also be selected for its ability to be machined through an automated machining process. For example, the fixed reinforced polymer material can be selected based on its ability to be machined through CNC to form pockets. Further, the fixed reinforced polymer material can be selected for its ability to support materials in forming either or both shielding layers and antenna layers. For example, the fixed reinforced polymer material can be selected for its ability to support a deposited magnetic shielding material in forming a shielding layer. In another example, the fixed reinforced polymer material can be selected for its ability to support a deposited conductor in forming an antenna.

The flowchart optionally continues to step 806, where the NMR sensor is calibrated across a plurality of NMR sensors. Calibration can include applicable operational techniques and tuning techniques that are applied in making NMR sensors operational in a downhole environment. In calibrating the NMR sensor across a plurality of NMR sensors, the plurality of NMR sensors can all be manufactured according to the same method of manufacturing the NMR sensor, as is represented by the flowchart shown in FIG. 8. Specifically, the plurality of NMR sensors can be manufactured by depositing layers of fixed reinforced polymer material, machining pockets in the polymer layers, and depositing materials in the layers to form antennas and magnetic shielding layers. In turn this can ensure greater uniformity amongst characteristics of the NMR sensors across the plurality of sensors, e.g. in comparison to when a technician manually manufactures the NMR sensors. For example, the antennas can be located within a specific threshold variance of each other across the NMR sensors and the plurality of sensors. As a result, the NMR sensor can be calibrated related to the plurality of NMR sensors.

The NMR sensor can be calibrated based on operation of the first antenna and the second antenna in the NMR sensor, e.g. relative to the plurality of NMR sensors. Specifically, characteristics of return signal signatures associated with operation of the first antenna and the second antenna can be assumed to be within a specific range of return signals associated with operation of the plurality of NMR sensors. More specifically, one or more of the plurality of NMR sensors can actually be operated to generate returns signal measurements of the NMR sensors. In turn, the NMR sensor that is being calibrated at step 806 can have an assumed return signal signature that is within a variance of the return signals measurements that are made based on actual operation of the other NMR sensors. As follows, the NMR sensor can be calibrated based on this assumed return signal signature. This can save both time and resources in calibrating the NMR sensor, as the NMR sensor does not need to actually be operated, at least to a full extent in generating return signals, in order to calibrate the NMR sensor.

The assumption that the characteristics of the return signal signatures are within the specific range of return signals associated with operation of the plurality of NMR sensors can be made based on positioning of the first antenna and the second antenna relative to each other in the NMR sensor. More specifically, it can be assumed that the position of the first antenna and the second antenna relative to each other are within a specific variance based on the manufacture of the NMR sensor according to the automated machining process. As follows, the assumption that the return signal signature is within the specific signal range can be made based on the assumed variance in the relative position of the first antenna and the second antenna to each other.

Further, the assumption that the characteristics of the return signal signatures are within the specific range of returns signals associated with operation of the plurality of NMR sensors can be made based on positioning of the first antenna and the second antenna relative to a magnet, or otherwise magnet array, within the mandrel of the downhole tool. More specifically, it can be assumed that the position of the first antenna and the second antenna relative to the magnet array for generating NMR responses are within a specific variance based on the manufacture of the NMR sensor according to the automated machining process. As follows, the assumption that the return signal signature is within the specific signal range can be made based on the assumed variance in the relative position of the first antenna and the second antenna to the magnet array.

Additionally, the assumption that the characteristics of the return signal signatures are within the specific range of return signals associated with operation of the plurality of NMR sensors is made based on the operation of the first antenna and the second antenna with electronic components of the NMR sensor for processing the return signals. Specifically, the actually measured return signals of the plurality of NMR sensors that are used in calibrating the NMR sensor can be made based on actual operation of electronic components in the NMR sensor. As follows, the assumption that the return signal signature of the NMR sensor will be within the specific range of return signals can be made to include an assumed operation of the first antenna and the second antenna of the NMR sensor with other electronic components of the NMR sensor. These electronic components can include applicable components that are used in generating NMR responses and processing the NMR responses.

Figure 9:
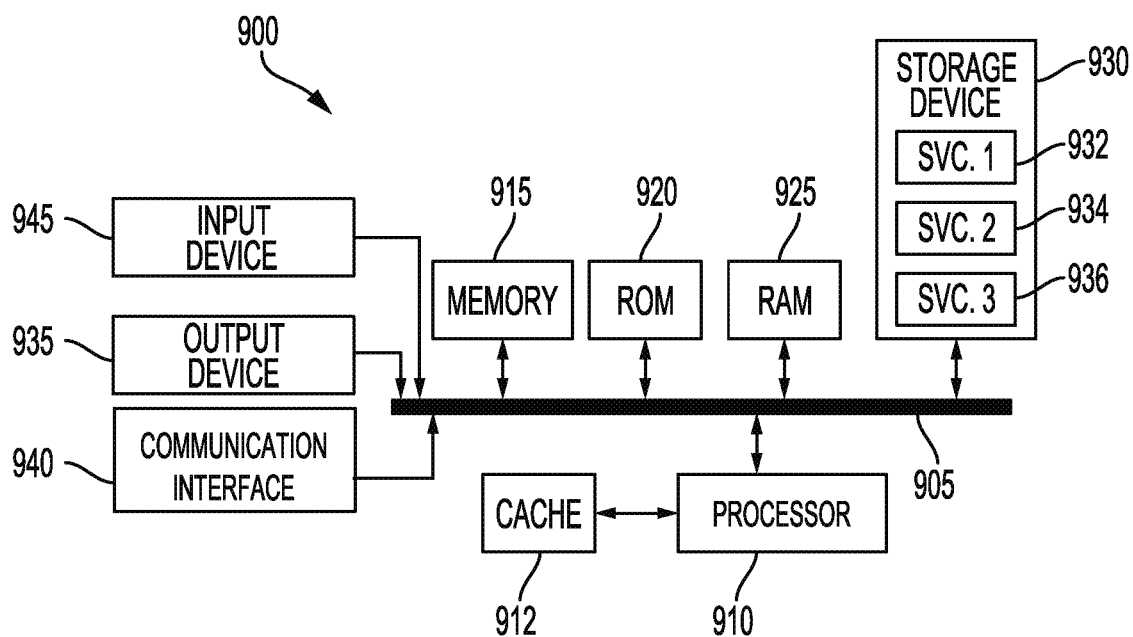
FIG. 9 illustrates an example computing device architecture which can be employed to perform various steps, methods, and techniques disclosed herein.

FIG. 9 illustrates an example computing device architecture 900 which can be employed to perform various steps, methods, and techniques disclosed herein. Specifically, the computing device architecture can be integrated with the electromagnetic imager tools described herein. Further, the computing device can be configured to implement the techniques of controlling borehole image blending through machine learning described herein.

As noted above, FIG. 9 illustrates an example computing device architecture 900 of a computing device which can implement the various technologies and techniques described herein. The components of the computing device architecture 900 are shown in electrical communication with each other using a connection 905, such as a bus. The example computing device architecture 900 includes a processing unit (CPU or processor) 910 and a computing device connection 905 that couples various computing device components including the computing device memory 915, such as read only memory (ROM) 920 and random access memory (RAM) 925, to the processor 910.

The computing device architecture 900 can include a cache of high-speed memory connected directly with, in close proximity to, or integrated as part of the processor 910. The computing device architecture 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device architecture 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device, etc. In some instances, multimodal computing devices can enable a user to provide multiple types of input to communicate with the computing device architecture 900. The communications interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. The storage device 930 can include services 932, 934, 936 for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1. A method of manufacturing a nuclear magnetic resonance ("NMR") sensor for a downhole tool comprising: forming a magnetic shielding layer of the NMR sensor in a first concentric layer about a mandrel of the downhole tool; forming a first antenna of a plurality of antennas of the NMR sensor in a second concentric layer on top of the first concentric layer through an automated machining process; and forming a second antenna of the plurality of the antennas of the NMR sensor in a third concentric layer on top of the second concentric layer through the automated machining process.

Statement 2. The method of statement 1, wherein forming the first antenna in the second concentric layer on top of the first concentric layer through the automated machining process further comprises: forming a fiber-reinforced polymer layer on top of the first concentric layer as part of the second concentric layer; machining a pocket in the fiber-reinforced polymer layer; and depositing an antenna material in the pocket formed in the fiber-reinforced polymer layer to form the first antenna as part of the second concentric layer.

Statement 3. The method of any of statements 1 and 2, wherein forming the second antenna in the third concentric layer on top of the second concentric layer through the automated machining process further comprises: forming a fiber-reinforced polymer layer on top of the second concentric layer as part of the third concentric layer; machining a pocket in the fiber-reinforced polymer layer; and depositing an antenna material in the pocket formed in the fiber-reinforced polymer layer to form the second antenna as part of the third concentric layer.

Statement 4. The method of any of statements 1 through 3, wherein forming the magnetic shielding layer of the NMR sensor in the first concentric layer about the mandrel of the downhole tool further comprises: forming a fiber-reinforced polymer layer concentrically about the mandrel of the downhole tool as part of the first concentric layer; machining one or more pockets in the fiber-reinforced polymer layer; and depositing a magnetic shielding material in the one or more pockets formed in the fiber-reinforced polymer layer to form the magnetic shielding layer as part of the first concentric layer.

Statement 5. The method of any of statements 1 through 4, wherein one or more of the first concentric layer, the second concentric layer, and the third concentric layer are formed in corresponding fiber-reinforced polymer layers.

Statement 6. The method of any of statements 1 through 5, wherein the corresponding fiber-reinforced polymer layers are included to form one or more of the first concentric layer, the second concentric layer, and the third concentric layer based on electrical conductivity characteristics of the corresponding fiber-reinforced polymer layers.

Statement 7. The method of any of statements 1 through 6, wherein the corresponding fiber-reinforced polymer layers are included to form one or more of the first concentric layer, the second concentric layer, and the third concentric layer based on signal attenuation characteristics of the corresponding fiber-reinforced polymer layers.

Statement 8. The method of any of statements 1 through 7, wherein the corresponding fiber-reinforced polymer layers are included to form one or more of the first concentric layer, the second concentric layer, and the third concentric layer based on mechanical characteristics of the corresponding fiber-reinforced polymer layers.

Statement 9. The method of any of statements 1 through 8, further comprising calibrating the NMR sensor based on operation of the first antenna and the second antenna within the NMR sensor.

Statement 10. The method of any of statements 1 through 9, wherein the NMR sensor is calibrated relative to a plurality of NMR sensors that are manufactured according to the method of manufacturing the NMR sensor.

Statement 11. The method of any of statements 1 through 10, further comprising: assuming characteristics of return signal signatures associated with the operation of the first antenna and the second antenna in the NMR sensor are within a specific range of return signals associated with operation of the plurality of NMR sensors; and calibrating the NMR sensor based on an assumption that the characteristics of the return signal signatures are within the specific range of return signals associated with operation of the plurality of NMR sensors.

Statement 12. The method of any of statements 1 through 11, wherein the assumption that the characteristics of the return signal signatures are within the specific range of return signals associated with operation of the plurality of NMR sensors is made based on positioning of the first antenna and the second antenna relative to each other in the NMR sensor.

Statement 13. The method of any of statements 1 through 12, wherein the assumption that the characteristics of the return signal signatures are within the specific range of return signals associated with operation of the plurality of NMR sensors is made based on positioning of the first antenna and the second antenna relative to a magnet within the mandrel of the downhole tool.

Statement 14. The method of any of statements 1 through 13, wherein the assumption that the characteristics of the return signal signatures are within the specific range of return signals associated with operation of the plurality of NMR sensors is made based on the operation of the first antenna and the second antenna with electronic components of the NMR sensor for processing the return signals.

Statement 15. A nuclear magnetic resonance ("NMR") sensor for a downhole tool comprising: a magnetic shielding layer formed in a first concentric layer about a mandrel of the downhole tool; a first antenna of a plurality of antennas formed in a second concentric layer on top of the first concentric layer through an automated machining process; and a second antenna of the plurality of the antennas formed in a third concentric layer on top of the second concentric layer through the automated machining process.

Statement 16. The NMR sensor of statement 15, wherein the automated machining process for forming the first antenna in the second concentric layer further comprises: forming a fiber-reinforced polymer layer on top of the first concentric layer as part of the second concentric layer; machining a pocket in the fiber-reinforced polymer layer; and depositing an antenna material in the pocket formed in the fiber-reinforced polymer layer to form the first antenna as part of the second concentric layer.

Statement 17. The NMR sensor of any of statements 15 and 16, wherein the automated machining process for forming the second antenna in the third concentric layer further comprises: forming a fiber-reinforced polymer layer on top of the second concentric layer as part of the third concentric layer; machining a pocket in the fiber-reinforced polymer layer; and depositing an antenna material in the pocket formed in the fiber-reinforced polymer layer to form the second antenna as part of the third concentric layer.

Statement 18. The NMR sensor of any of statements 15 through 17, wherein the magnetic shielding layer is formed in the first concentric layer about the mandrel of the downhole tool by: forming a fiber-reinforced polymer layer concentrically about the mandrel of the downhole tool as part of the first concentric layer; machining one or more pockets in the fiber-reinforced polymer layer; and depositing a magnetic shielding material in the one or more pockets formed in the fiber-reinforced polymer layer to form the magnetic shielding layer as part of the first concentric layer.

Statement 19. The NMR sensor of any of statements 15 through 18, wherein the NMR sensor is calibrated relative to a plurality of NMR sensors that are manufactured according to a same method of manufacturing the NMR sensor.

Statement 20. The NMR sensor of any of statements 15 through 19, wherein the NMR sensor is calibrated by: assuming characteristics of return signal signatures associated with operation of the first antenna and the second antenna in the NMR sensor are within a specific range of return signals associated with operation of the plurality of NMR sensors; and calibrating the NMR sensor based on an assumption that the characteristics of the return signal signatures are within the specific range of return signals associated with operation of the plurality of NMR sensors.

Statement 21. A system comprising means for performing a method according to any of statements 1 through 14.

What is claimed is:

1. A method of manufacturing a nuclear magnetic resonance ("NMR") sensor for a downhole tool comprising:
   forming a magnetic shielding layer of the NMR sensor in a first concentric layer about a mandrel of the downhole tool;
   forming a first antenna of a plurality of antennas of the NMR sensor in a second concentric layer on top of the first concentric layer through an automated machining process; and
   forming a second antenna of the plurality of the antennas of the NMR sensor in a third concentric layer on top of the second concentric layer through the automated machining process.

2. The method of claim 1, wherein forming the first antenna in the second concentric layer on top of the first concentric layer through the automated machining process further comprises:
   forming a fiber-reinforced polymer layer on top of the first concentric layer as part of the second concentric layer;
   machining a pocket in the fiber-reinforced polymer layer; and
   depositing an antenna material in the pocket formed in the fiber-reinforced polymer layer to form the first antenna as part of the second concentric layer.

3. The method of claim 1, wherein forming the second antenna in the third concentric layer on top of the second concentric layer through the automated machining process further comprises:
   forming a fiber-reinforced polymer layer on top of the second concentric layer as part of the third concentric layer;
   machining a pocket in the fiber-reinforced polymer layer; and
   depositing an antenna material in the pocket formed in the fiber-reinforced polymer layer to form the second antenna as part of the third concentric layer.

4. The method of claim 1, wherein forming the magnetic shielding layer of the NMR sensor in the first concentric layer about the mandrel of the downhole tool further comprises:
   forming a fiber-reinforced polymer layer concentrically about the mandrel of the downhole tool as part of the first concentric layer;
   machining one or more pockets in the fiber-reinforced polymer layer; and
   depositing a magnetic shielding material in the one or more pockets formed in the fiber-reinforced polymer layer to form the magnetic shielding layer as part of the first concentric layer.

5. The method of claim 1, wherein one or more of the first concentric layer, the second concentric layer, and the third concentric layer are formed in corresponding fiber-reinforced polymer layers.

6. The method of claim 5, wherein the corresponding fiber-reinforced polymer layers are included to form one or more of the first concentric layer, the second concentric layer, and the third concentric layer based on electrical conductivity characteristics of the corresponding fiber-reinforced polymer layers.

7. The method of claim 5, wherein the corresponding fiber-reinforced polymer layers are included to form one or more of the first concentric layer, the second concentric layer, and the third concentric layer based on signal attenuation characteristics of the corresponding fiber-reinforced polymer layers.

8. The method of claim 5, wherein the corresponding fiber-reinforced polymer layers are included to form one or more of the first concentric layer, the second concentric layer, and the third concentric layer based on mechanical characteristics of the corresponding fiber-reinforced polymer layers.

9. The method of claim 1, further comprising calibrating the NMR sensor based on operation of the first antenna and the second antenna within the NMR sensor.

10. The method of claim 9, wherein the NMR sensor is calibrated relative to a plurality of NMR sensors that are manufactured according to the method of manufacturing the NMR sensor.

11. The method of claim 10, further comprising:
    assuming characteristics of return signal signatures associated with the operation of the first antenna and the second antenna in the NMR sensor are within a specific range of return signals associated with operation of the plurality of NMR sensors; and
    calibrating the NMR sensor based on an assumption that the characteristics of the return signal signatures are within the specific range of return signals associated with operation of the plurality of NMR sensors.

12. The method of claim 11, wherein the assumption that the characteristics of the return signal signatures are within the specific range of return signals associated with operation of the plurality of NMR sensors is made based on positioning of the first antenna and the second antenna relative to each other in the NMR sensor.

13. The method of claim 11, wherein the assumption that the characteristics of the return signal signatures are within the specific range of return signals associated with operation of the plurality of NMR sensors is made based on positioning of the first antenna and the second antenna relative to a magnet within the mandrel of the downhole tool.

14. The method of claim 11, wherein the assumption that the characteristics of the return signal signatures are within the specific range of return signals associated with operation of the plurality of NMR sensors is made based on the operation of the first antenna and the second antenna with electronic components of the NMR sensor for processing the return signals.

15. A nuclear magnetic resonance ("NMR") sensor for a downhole tool comprising:
    a magnetic shielding layer formed in a first concentric layer about a mandrel of the downhole tool;
    a first antenna of a plurality of antennas formed in a second concentric layer on top of the first concentric layer through an automated machining process; and
    a second antenna of the plurality of the antennas formed in a third concentric layer on top of the second concentric layer through the automated machining process.

16. The NMR sensor of claim 15, wherein the automated machining process for forming the first antenna in the second concentric layer further comprises:
    forming a fiber-reinforced polymer layer on top of the first concentric layer as part of the second concentric layer;
    machining a pocket in the fiber-reinforced polymer layer; and
    depositing an antenna material in the pocket formed in the fiber-reinforced polymer layer to form the first antenna as part of the second concentric layer.

17. The NMR sensor of claim 15, wherein the automated machining process for forming the second antenna in the third concentric layer further comprises:
    forming a fiber-reinforced polymer layer on top of the second concentric layer as part of the third concentric layer;
    machining a pocket in the fiber-reinforced polymer layer; and
    depositing an antenna material in the pocket formed in the fiber-reinforced polymer layer to form the second antenna as part of the third concentric layer.

18. The NMR sensor of claim 15, wherein the magnetic shielding layer is formed in the first concentric layer about the mandrel of the downhole tool by:
    forming a fiber-reinforced polymer layer concentrically about the mandrel of the downhole tool as part of the first concentric layer;
    machining one or more pockets in the fiber-reinforced polymer layer; and
    depositing a magnetic shielding material in the one or more pockets formed in the fiber-reinforced polymer layer to form the magnetic shielding layer as part of the first concentric layer.

19. The NMR sensor of claim 15, wherein the NMR sensor is calibrated relative to a plurality of NMR sensors that are manufactured according to a same method of manufacturing the NMR sensor.

20. The NMR sensor of claim 19, wherein the NMR sensor is calibrated by:
    assuming characteristics of return signal signatures associated with operation of the first antenna and the second antenna in the NMR sensor are within a specific range of return signals associated with operation of the plurality of NMR sensors; and
    calibrating the NMR sensor based on an assumption that the characteristics of the return signal signatures are within the specific range of return signals associated with operation of the plurality of NMR sensors.

* * * * *